United States Patent [19]

Yamada

[11] Patent Number: 4,751,672
[45] Date of Patent: Jun. 14, 1988

[54] SEQUENCE CONTROL SYSTEM EMPLOYING A PLURALITY OF PROGRAMMABLE LOGIC CONTROLLERS

[76] Inventor: Akihiro Yamada, c/o Patent Dept., Omron Tateisi Electronics Co., Shimo-kaiinji, Nagaokakyo-shi, Kyoto, Japan

[21] Appl. No.: 930,050

[22] Filed: Nov. 12, 1986

Related U.S. Application Data

[63] Continuation of Ser. No. 650,097, Sep. 13, 1984, abandoned, which is a continuation-in-part of Ser. No. 392,241, Jun. 25, 1982, abandoned.

[30] Foreign Application Priority Data

Jun. 27, 1981 [JP] Japan .............................. 56-100199

[51] Int. Cl.⁴ .............................................. G06F 3/00
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 4,162,536 | 7/1979 | Morley | 364/900 |
| 4,176,395 | 11/1979 | Evelyn-Veere et al. | 364/420 |
| 4,319,338 | 3/1982 | Grudowski et al. | 364/900 |
| 4,354,226 | 10/1982 | Flickinger et al. | 364/900 |
| 4,477,882 | 10/1984 | Schumacher et al. | 364/900 |
| 4,667,323 | 5/1987 | Engdahl et al. | 340/825.52 |
| 4,680,753 | 7/1987 | Fulton et al. | 370/89 |

Primary Examiner—Archie E. Williams, Jr.
Assistant Examiner—Michael J. Ure
Attorney, Agent, or Firm—Cushman, Darby & Cushman

[57] ABSTRACT

A sequence control system employing a plurality of programmable logic controllers, each having the same construction and being linkedly connected, can perform complicated sequence control resulting from executing an overall user program based on that of each programmable logic controller while exchanging necessary input/output data; each of the programmable logic controllers can also perform sequence control by itself.

10 Claims, 5 Drawing Sheets

SEQUENCE CONTROL SYSTEM EMPLOYING A PLURALITY OF PROGRAMMABLE LOGIC CONTROLLERS

This is a continuation of application Ser. No. 650,097, filed Sept. 13, 1984 and now abandoned, which is a continuation-in-part of application Ser. No. 392,241, filed June 25, 1982 and now abandoned.

BACKGROUND OF THE INVENTION

The present invention relates to a system for performing sequence control. More particularly, it relates to a sophisticated system available to perform complicated sequence control by employing a plurality of programmable logic controllers; each is substantially constructed much the same and is able to individually perform sequence control, nevertheless.

A sequence control system constructed having a great many mechanical relays is well known in the art and is used as a sequence controller to perform sequence control on complex machines used in manufacturing.

A programmable logic controller, or a programmable controller, however, is newly designed for its reliability, for its ease in making or changing sequence control programs performed as user programs, for its operability and for its trouble shooting capabilities if down.

Such a programmable logic controller (hereinafter, called PLC), for the most part, has limited capabilities caused by slow response speed and so on. Therefore, in case one PLC performs sequence control in accordance with its user program it is likely to limit many externally controllable devices which send input control signals to the PLC and which receive output control signals from it so as to be controlled during an execution of a sequence control program.

On the other hand, with respect to general sequence control systems, some systems include a large number of controllable devices which strain the limits of one PLC; accordingly, a large scale control system is required.

In keeping with its need for such a large scale system, it is recommended that the process ability of the PLC itself be increased a great deal. However, a PLC having a considerably increased large ability is not frequently necessary therefore, it is impossible to obtain efficiencies by mass production. Accordingly, it becomes costly to build such a sequence control system.

It is more practical to have a plurality of PLCs of medium or small capabilities parallelly operate, so as to act as an overall PLC, of the large scale type, available to control a large system, although in fact the PLCs of medium or small type, each have small ability.

As above described, a PLC has an output terminal connected to a corresponding external device to be controlled; the number of output terminals of a PLC is limitted. In case two PLCs, for example, are coupled to parallelly operate in a conventional manner, a certain output terminal of one PLC is wire connected to a certain input terminal of the other PLC; the one supplies its specific input/output state to its output terminal with respect to its program and the other receives the specific input/output state from the one PLC through its own input terminal, connected to the output terminal of the one PLC. That is, the input or output terminal connected to each other acts to exchangedly transfer signals, although in fact it is likely to be connected to an external device to be controlled. This is the same, in case two or more PLCs are coupled to parallelly operate.

Consequently, a considerable number of input and output terminals connected to external devices are used for parallelly operating a plurality of PLCs; the number of actually usable input and output terminals connected to external devices is extremely lessened. That is, an effective expansibility of a system scale to control external devices is not thusly improved; PLCs are more and more used, nevertheless.

In addition, it is necessary to correspondingly set a complicated coupling among a plurality of PLCs so as to parallelly operate them with respect to a complicated sequence program. Therefore, it is required that wiring between input and output terminals of PLCs be very complicated; it is difficult to check after completing the wiring and to alternate coupling among PLCs, once wired, so as to change sequence control performed by a parallel operation of plurality of PLCs.

SUMMARY OF THE INVENTION

It is therefore a general object of the present invention to provide an improved sequence control system.

It is another general object of the present invention to perform more complicated sequence control by employing a plurality of programmable logic controllers.

It is a further general object of the present invention to provide a sequence control system having a plurality of programmable logic controllers which permits each programmable logic controller to individually perform its own sequence control.

It is yet still another general object of the present invention to provide a sequence control system having a plurality of programmable logic controllers which permits each programmable logic controller to exchange data so that more complicated sequence control is successfully performed.

DESCRIPTION OF THE PREFERRED EMBODIMENT

Figure 1:
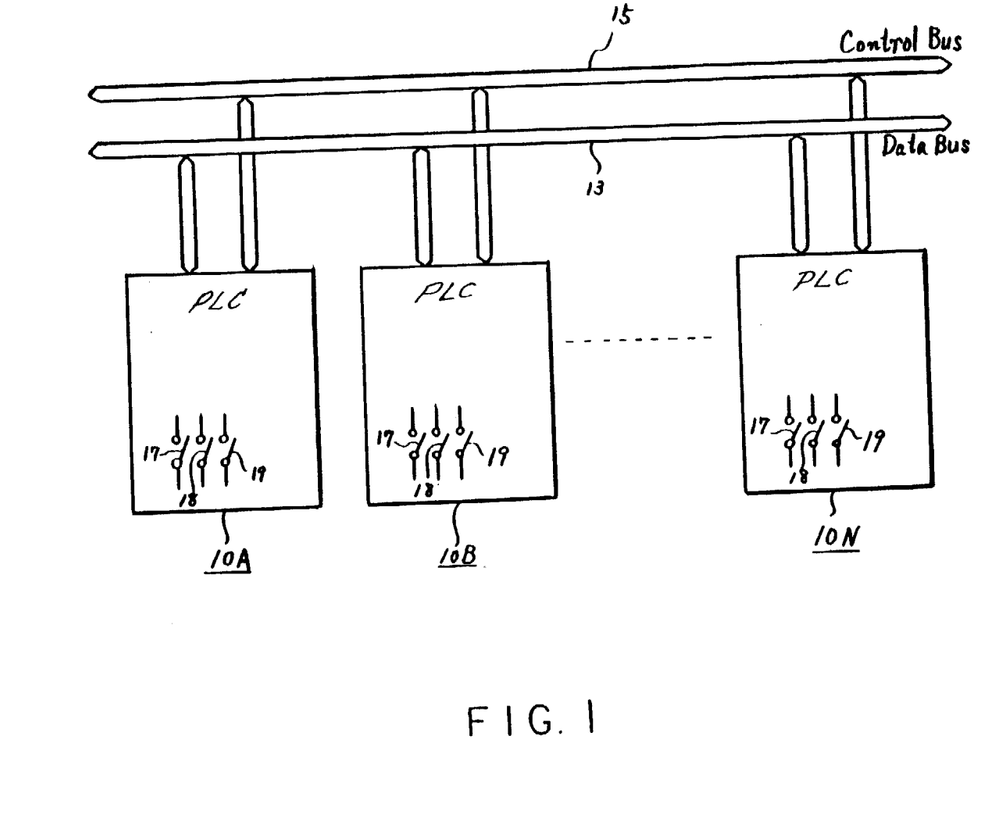
FIG. 1 is a block diagram of a sequence control system employing a plurality of programmable logic controllers constructed in accordance with the principles of the present invention, all of the controllers being interconnected by bus lines.

The present invention will now be described with refrence to the preferred embodiment thereof, and with reference to the appended drawings. FIG. 1 shows a prefered embodiment. In this figure, a plurality of programmable logic controllers 10A through 10N are interconnected by a data bus 13 and a control bus 15 so as to constitute a sequence control system. Each programmable logic controller (hereinafter, called PLC) is composed much the same. There are three kinds of setting switches within each PLC: a host switch 17, a stand alone switch 18 and an equipment number switch 19.

The host switch 17 is used for deciding which PLC is to be the master equipment from among the plurality of PLCs 10A–N in order to dominate synchronous control. One PLC is selected to function as the master equipment upon turning on its host switch 17; the others work as subsidiary equipment. Each PLC is available to independently function as a traditional programmable logic controller, resulting from turning on its stand alone switch 18. It is possible to identify each PLC, in the event that a plurality of linked PLCs are used in accordance with the present invention, by turning on the equipment number switch 19 of each PLC.

Figure 2:
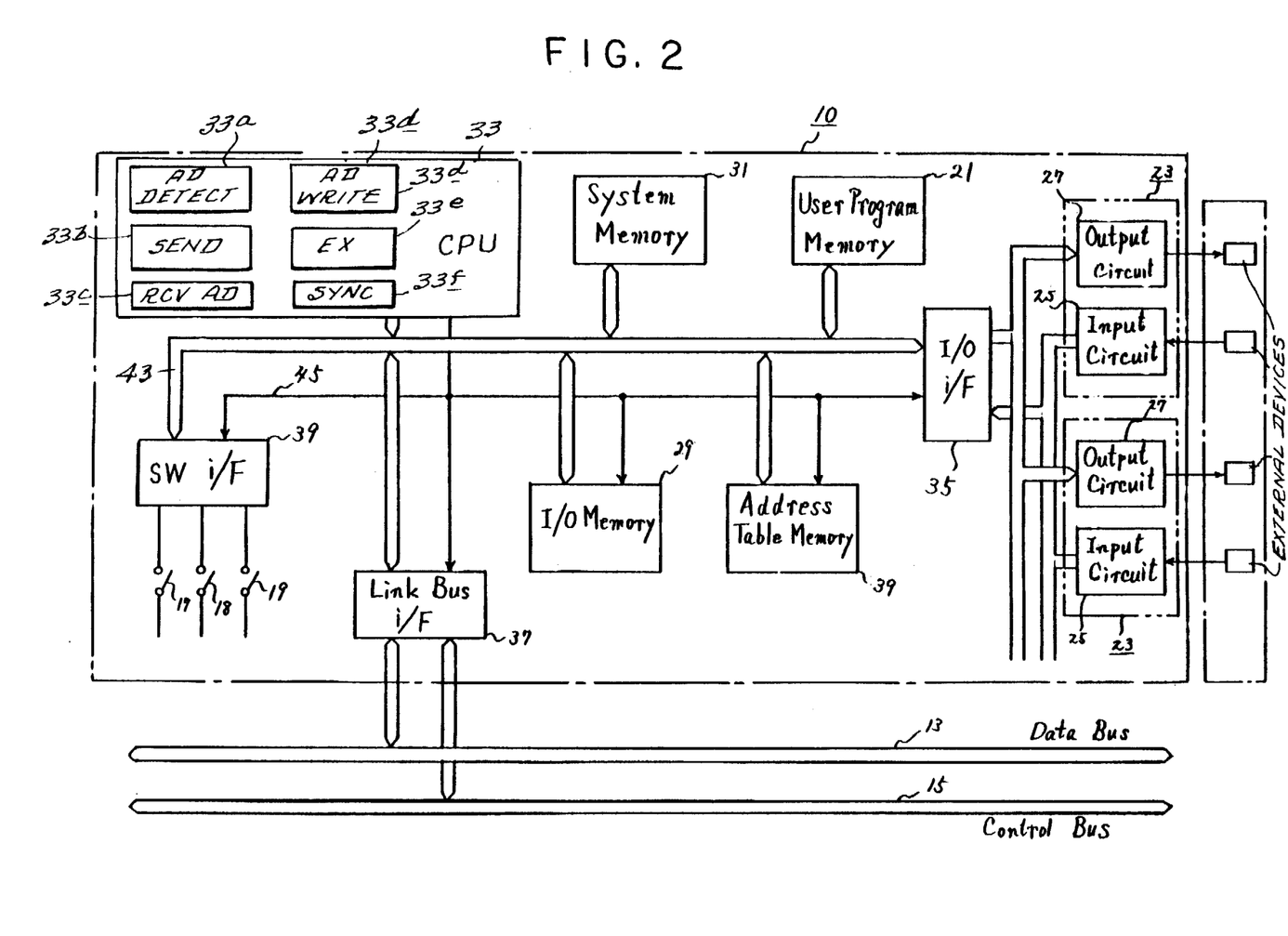
FIG. 2 is a block diagram of an illustrative embodiment of a programmable logic controller employed in the sequence control system.

FIG. 2 shows a preferred embodiment of one PLC composing the sequence control system illustrated in FIG. 1. The representative PLC 10 comprises a user program memory 21 for storing a user program including sequence control instructions in accordance with a ladder diagram. Included are a plurality of input and output (I/O) circuitries 23; each circuitry 23 provides an input circuit 25 for receiving an input signal derived from externally controlled machinery, not shown, and an output circuit 27 for sending an output signal to externally controlled machinery, not shown.

Further, each PLC 10 provides an input and output (I/O) memory 29 which has a large enough storage capacity to store data from its own equipment and data derived from other equipments (PLCs) through the data bus 13.

There also is a system memory 31 which stores a system program (interpreter program) to rule over the PLCs. Included is a microprocessor (hereinafter, called CPU) 33 which controls the PLC. Running with respect to the system program stored in the system memory 31, the CPU 33 executes the decode processing of the user program instructions and the revise processing.

The decode processing above described contributes to successively execute instructions of the user program stored in the user program memory 21, to perform logical arithmetic operations on the basis of data stored in the I/O memory 29 and to write its results into the I/O memory 29.

The revise processing acts to write input data from the input circuit 25 of the I/O circuitry 23 to the predetermined area of the I/O memory 29 and to send output data from the predetermined area of the I/O memory 29 to the output circuit of the I/O circuitry 23. Upon revise processing caused by the CPU 33 input and output data are transferred between the I/O circuitry 23 and the I/O memory 29 via an input and output interface 35.

In addition to both the record processing and the revise processing above described, the CPU 33 performs control for exchanging data among a plurality of PLCs as described later and performs all of other main control of the PLCs.

Each of a plurality of PLCs, constituted much the same, has a respective link bus interface 37 so that data transfer is successfully performed among the PLCs through it.

There is further a switch interface circuit 39 so as to couple three switches 17, 18 and 19 shown in FIG. 1 with the other components of PLC 10: CPU 33, I/O memory 29 and so on.

In addition, the PLC 10 has an address table memory 39 available to store an address used in other PLCs. Each PLC 10 further provides its own internal bus 43 capable to transfer data among its units and a control signal link 45 of one bit so that the CPU 33 controls the other units.

In the sequence control system shown in FIG. 1, according to the present invention, there are provided a plurality of PLCs 10A–N, each composed much the same; which are connected with the data bus 13 and the control bus 15 so as to successfully transfer data between themselves.

In the sequence control system employing a plurality of PLCs shown in FIG. 1, one host switch 17 (for example, of the PLC 10A) is turned on, so that its PLC 10A would be selected to work as master equipment; meanwhile, the other PLCs 10B–N whose host switches 17 are on the "OFF" condition are subsidiary equipment.

Considering the I/O memory 29, it should be understood that its data storage capability is enough so large that it can be used to store not only data resulting from processing by the PLC (hereinafter, called intra-equipment) including this memory 29, but also data derived from the other PLCs linked thereto (hereinafter, called extra-equipment) by the data bus 13 and the control bus 15. Accordingly, the I/O memory 29 of one PLC 10 has address areas assigned to an intra-equipment field corresponding to the I/O circuitries 23 of the intra-equipment and to an extra-equipment field corresponding to the counterpart of I/O circuitries the extra-equipment. This data stored in both fields of the I/O memory 29 are processed while executing the user program stored in the user program memory 21.

Two PLCs are employed in the sequence control system with respect to the present invention so as to give an effective example in the following description. The data bus 13 and the control bus 15 interconnect the two PLCs; one of them works as a master equipment whose host switch 17 has been turned on, and the other works as a subsidiary equipment whose host switch is maintained at the "off" position. Therefore, the PLC designated as a master equipment dominates synchronous control of the sequence control system and the other PLC named as a subsidiary equipment receives the synchronous control from the master equipment.

Figure 3:
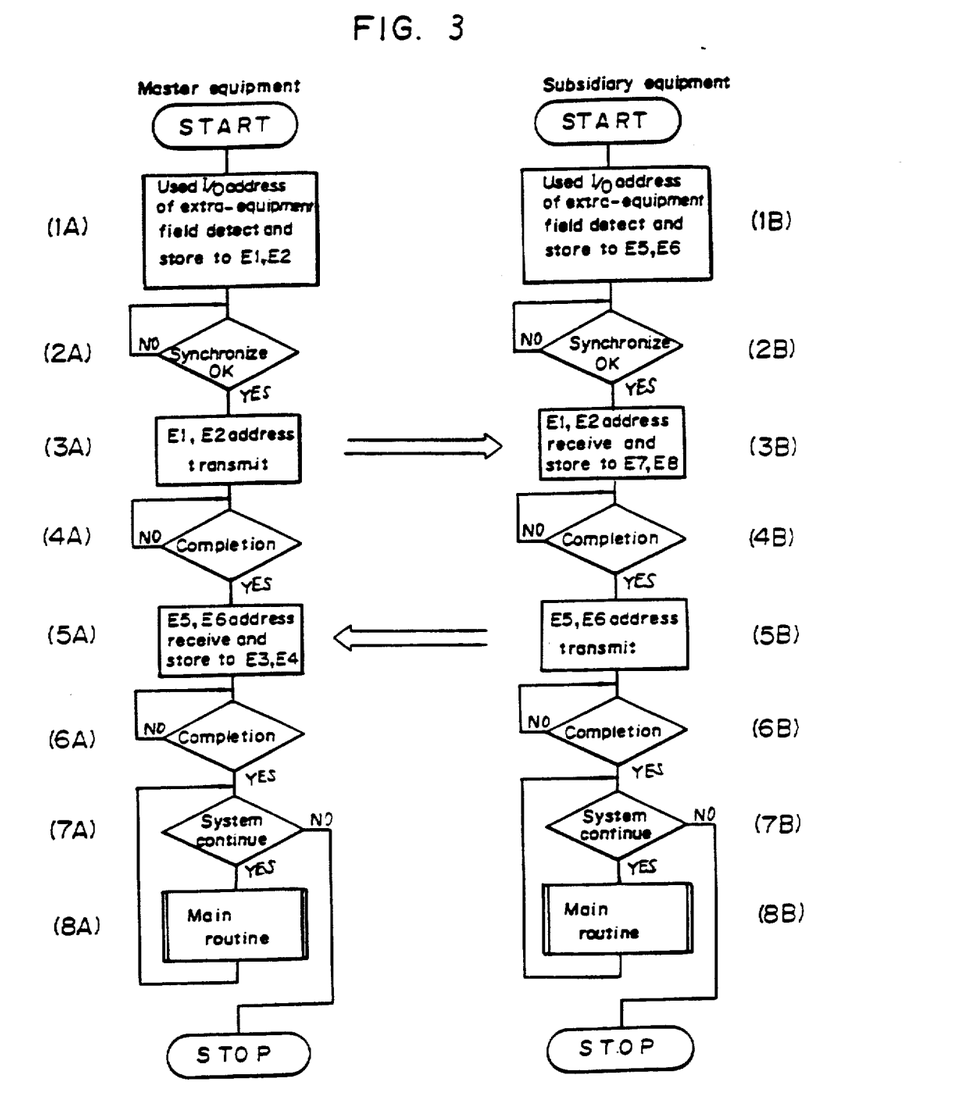
FIG. 3, consisting of (1A)-(8B), is a flow chart showing the control executed by a sequence control system employing two linked programmable logic controllers.

FIG. 3 shows a flow chart of an essential part of the system program stored in the system memory 31. This part focusses on an initialize process executed when power is supplied to both the master equipment and the subsidiary equipment caused by turning on the power source (not shown). If such power is supplied, then the initialize process can be successively executed as described in the following.

The first steps 1A and 1B are run by both PLCs and are equal routines; in this routine the user program stored in the user program memory 21 of the intra-equipment, or PLC, is successively checked to detect the user instructions used for the I/O address of the extra-equipment field and to store the I/O address of the used extra-equipment field in the determined area of the address table memory 39.

Figure 4:
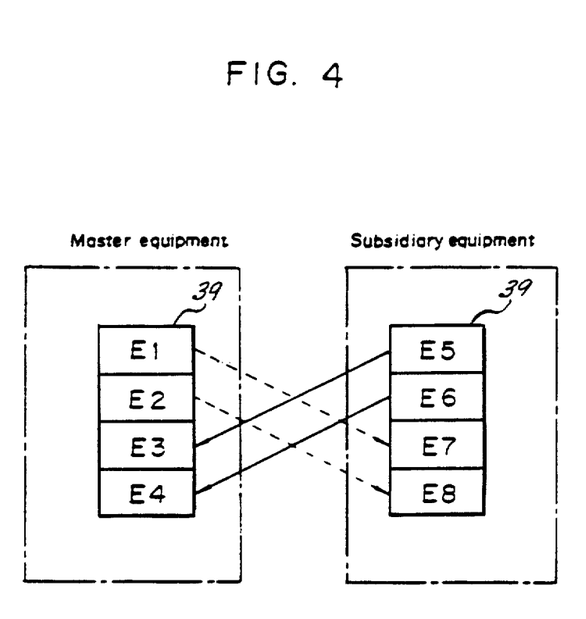
FIG. 4 is a block diagram of two illustrative address table memories, each having a plurality of section area, each being included within a respective programmable logic controller of the sequence control system employing two linked controllers.

The address table memory 39 of the master equipment and the subsidiary equipment, respectively, is divided into four memory sections as shown in FIG. 4. The master equipment has its address table memory 39 divided into four sections E1, E2, E3 and E4. These sections E1 and E2 are available to store the I/O address of the extra-equipment (or the subsidiary equipment) field used with the user program of the master equipment; that is, one section E1 is an area for storing an input address of the I/O address, while the other section E2 is for storing an output address of the I/O address.

On the other hand, the address table memory 39 of the subsidiary equipment is similar to the counterpart of the master equipment; thus, it is provided into four sections E5, E6, E7 and E8. These sections E5 and E6 store the I/O address of the extra-equipment (or master equipment) field used in the user program of the subsidiary equipment; that is, one section E5 is an area for storing an input address of the I/O address, while the other section E6 is for storing an output address.

Here, an above described input address is an address of I/O data for the extra-equipment, but this I/O data is input data for the intra-equipment. Accordingly, despite the fact that I/O data is to be output data for the extra-equipment, the address of the I/O data is stored in the section E1 or E5 because the I/O data is input data for the intra-equipment in the case that the intra-equipment performs an arithmetic operation after getting output data from the extra-equipment. When output data revision in the extra-equipment is performed with respect to the output address of the intra-equipment, the output data address of the extra-equipment is stored.

Consequently, it is possible for each PLC to perform an arithmetic operation on the basis of data provided by both intra and extra equipments; the intra-equipment can perform such an operation after output data is derived from the extra-equipment. In the case that the intra-equipment performs an arithmetic operation on the basis of only input data from the extra-equipment, it requires that only the address of input data supplied from the extra-equipment to the intra-equipment be stored in the memory areas E1 and E5.

In FIG. 3, next steps 2A and 2B executed by both PLCs, or the master and the subsidiary equipments, are routines for establishing synchronization under control of the master equipment. In this case, the control of synchronization is performed by a handshake method.

If synchronization is established between both PLCs, the master equipment transmits the used I/O address stored in the memory areas E1 and E2 of the address table memory 39 to the subsidiary equipment through the data bus 13 (step 3A). Meanwhile, the subsidiary equipment receives the used I/O address transmitted from the master equipment and then stores this used I/O address in the memory areas E7 and E8 of its address table memory 39. This action is shown in FIG. 4 as indicated by a dotted line; the input address stored in the memory area E1 is transferred to the memory area E7 and the output address stored in the memory area E2 is transferred to the memory area E8.

Since transmission of the used I/O address is performed at every address by a hand shake method, the completion of transfer of the final used I/O address to be transferred must be confirmed in both equipment prior to switching of transmission and reception. The master equipment changes its mode from transmission to reception if it confirms completion of transfer of the final used I/o address in step 4A; if the subsidiary equipment confirms completion of transfer of the final used I/O address in step 4B, it causes its mode to be changed from reception to transmission.

Subsequently, the subsidiary equipment, having changed its mode, transmits the used I/O address stored in the memory areas E5 and E6 of its address table memory 39 to the master equipment through the data bus 13 in step 5B; meanwhile, the master equipment stores the used I/O address transmitted from the subsidiary equipment in memory areas E3 and E4 of its address table memory 39 in step 5A. Therefore, as shown in FIG. 4, the input address of the memory area E5 is transferred to the memory area E3 and the output address of the memory area E6 is transferred to the memory area E4.

Then, both PLCs, or the master and the subsidiary equipments, execute the corresponding step 6A or 6B so as to confirm completion of reception or transmission of all the used I/O addresses to be transferred. After both PLCs have confirmed its respective completion of reception or transmission, the master equipment executes both steps 7A and 8A and the subsidiary equipment executes both steps 7B and 8B so that each PLC, or the master or the subsidiary equipment, executes the main routine; consenquently, each PLC executes the respective user program stored in its user program memory 21.

Figure 5:
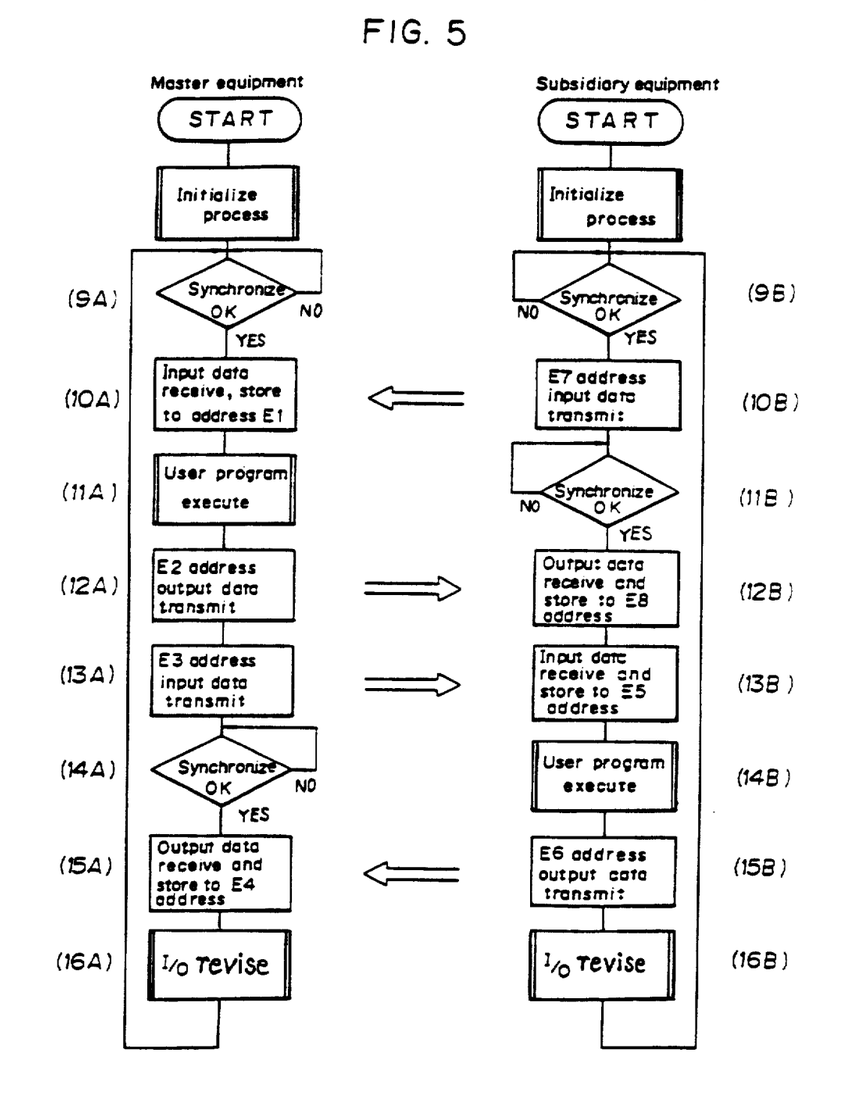
FIG. 5 is a flow chart showing the control executing main system program in the sequence control system employing two linked programmable logic controllers.

A flow chart as shown in FIG. 5 is a system program including the above described main routine executed by both PLCs, or the master and the subsidiary equipments. This system program is stored in the system memory 31 of the respective PLC. Hereinafter, a description about the main routine will be detailed in accordance with this flow chart of FIG. 5.

After completion of the above mentioned initialization process, both PLCs execute steps 9A and 9B, respectively, so as to establish a successful synchronization between both PLCs.

If the synchronization between both PLCs is established, the subsidiary equipment executes a step 10B so as to successively read out the input address (I/O data address of the subsidiary equipment field used by the master equipment) stored in the memory area E7 of the address table memory 39. The input address which is read out designates an address in the I/O memory 29 of the subsidiary equipment; thereby, the input data, successively read out with respect to the designated address, are successively transmitted to the master equipment through the data bus 13. Meanwhile, the master equipment executes a step 10A in order to receive the input data which are successively derived from the subsidiary equipment through the data bus 13. The input address stored in the memory area E1 of the address table memory 39 included within the master equipment, which is the same address stored in the memory area, designates successively addresses in the I/O memory 29 of the master equipment; therefore, the input data, successively received through the data bus 13, are successively written into the I/O memory 29 in accordance with the designated address. Accordingly, the input data stored in the subsidiary equipment field used by the master equipment were transferred from the I/O memory 29 of the subsidiary equipment to that of the master equipment. This is represented in FIG. 2 by software module 33a—aD DET (address determining) and 33b SEND.

When a transfer of the input data from the subsidiary equipment to the master equipment is completed, the master equipment proceeds to a step 11A in order to execute the user program stored in its user program memory 21 on the basis of the I/O data stored in its I/O memory 29 at that time; the I/O memory 29 is rewritten into new output data with respect to the execution results in its user program. During the execution of the step 11A by the master equipment, the subsidiary equipment executes a step 11B so as to wait for the master equipment to complete its circulative execution of its user program until the synchronization between both PLCs is again established.

When the synchronization is again established between both PLCs, the master equipment executes a step 12A so as to successively read out the output addresses stored in the memory area E2 included within its address table memory 39, which are the output addresses of the subsidiary equipment field used by the master equipment. This is shown by software module 33c—RCV AD (receive address). The output address read out designates an address in the I/O memory 29 of the master equipment; therefore, the output data read out with respect to the designated addresses are successively transferred to the subsidiary equipment through the data bus 13.

This address writing is shown as AD WRIT 33d.

The subsidiary equipment, meanwhile, executes a step 12B in order to successively receive the output data derived from the master equipment. An address of the I/O memory 29 of the subsidiary eqipment is successively designated by the output address stored in the memory area E8 of its address table memory 39; this output address is the same content as that stored in the memory area E2. Consequently, the output data stored in the subsidiary equipment field of the I/O memory 29 used by the master equipment have been transferred to the I/O memory 29 of the subsidiary equipment Further, the master equipment executes a step 13A so as to successively read out the input address stored in the memory area E3 of its address table memory 39; the input address is the one for the master equipment used by the subsidiary equipment. An address of the I/O memory 29 of the master equipment is designated by the input address successively read out; thereby, the input data read out from the master equipment are successively transferred to the subsidiary equipment through the data bus 13.

The subsidiary equipment, meanwhile, executes a step 13B in order to successively receive the input data transferred from the master equipment. An address in the I/O memory 29 of the subsidiary equipment is successively designated by the input address stored in the memory area E5 of its address table memory 39; the input address is the same content as that of the memory area E3. Thereby, the subsidiary equipment writes successively the received input data into its I/O memory 29. Consequently, the input data stored in the master equipment field of the master equipment used by the subsidiary equipment have been transferred to the I/O memory 29 of the subsidiary equipment. This is shown by software module 33e.

When transfer of the input data from the master equipment to the subsidiary equipment is completed, the subsidiary equipment executes the user program stored in its user program memory 21 on the basis of the I/O data stored in its I/O memory 29 at that time; therefore, the output data in its I/O memory 29 are rewritten at the consequence of an execution by the subsidiary equipment. The master equipment, meanwhile, executes a step 14A so as to wait for the subsidiary equipment to complete its execution of the user program and therefore synchronization is again established between both PLCs. This synchronization is shown as 33f.

When synchronization is successfully established, the subsidiary equipment executes the step 15B so as to successively read out the output address stored in the memory area E6 of its address table memory 39; the output address is one of the master equipment field used by the subsidiary equipment. An address in the I/O memory 29 of the subsidiary equipment is designated by the output address read out; thereby, the output data read out from the subsidiary equipment are successively transferred to the master equipment through the data bus 13.

The master equipment, meanwhile, executes a step 15A so as to successively receive the output data derived from the subsidiary equipment. An address in the I/O memory 29 of the subsidiary equipment is successively designated by the output address stored in the memory area E3 of its address table memory 39; the output address is the same content as that of the memory area E6. Thereby, the master equipment writes successively the received output data into its own I/O memory 29. Consequently, the output data stored in the master equipment field of the I/O memory 29 of the subsidiary equipment used by the subsidiary equipment have been transferred to the I/O memory 29 of the master equipment.

Subsequently, both PLCs execute steps 16 A and 16B, respectively, so that each PLC performs an I/O revising process in the respective intra-equipment. Hence, the output data of the I/O memory 29 are transferred to its corresponding output circuit 27 of the I/O circuitry 23; the input data of the corresponding input circuit 25 of the I/O circuitry 23 are transferred to the I/O memory 29. This input and output data exchanging is successively performed through inside bus 43 as being controlled by the control line 45. Accordingly, by executing the above described steps, one cycle of the main routine is completely performed, and both PLCs return to steps 9A and 9B, respectively. Therefore, both PLCs execute repeatedly the program steps.

In such a way as described above, both PLCs of the master and subsidiary equipment execute sequence control not only on the basis of the I/O data stored in the memory field assigned to the respective intra-equipment, but also on the basis of the I/O data stored in the memory field assigned to the extra-equipment.

As shown by FIG. 5, the master and the subsidiary equipments do not execute the respective user programs at the same time but both equipment execute alternatively the respective user programs. The present invention, however, is not limited by this execution; that is, it is also possible for each PLC to be composed to simultaneously start its execution of a user program after exchanging the I/O data necessary to successfully perform an overall sequence control between both PLCs.

In this case, at first, the subsidiary equipment transmits its I/O data stored in its I/O memory 29 with respect to the address stored in the memory area E7, or E1, to the counterpart of the master equipment and the master equipment transmits its I/O data stored in its I/O memory 29 with respect to the address stored in the memory area E3, or E5, to the counterpart of the subsidiary equipment. Therefore, both PLCs execute the respective user program on the basis of the data stored in its own I/O memory 29; subsequently, the output data stored in the I/O memory 29 of the subsidiary equipment are transmitted to the counterpart of the master equipment in accordance with the address stored in the memory area E8, or E2, and the output data stored in the I/O memory 29 of the master equipment are transmitted to the counterpart of the subsidiary equipment in accordance with the address stored in the memory area E4, or E6. Consequently, each PLC performs in its I/O receiving process in the respective intra-equipment.

In the embodiment above described, the memory area E1, or E7, of the master equipment stores the address corresponding to the I/O data of the extra-equipment used by the master equipment; the memory area E5, or E3, of the subsidiary equipment stores the address corresponding to the I/O data of the extra-equipment used by the subsidiary equipment. Further, the memory area E2, or E8, of the master equipment stores the address corresponding to the I/O data to be revised for the extra-equipment; the memory area E6, or E4, of the subsidiary equipment stores the address correspondent to the I/O data to be revised for the extra-equipment.

However, is is also contemplated that the memory area E1, or E7, of the master equipment store only addresses corresponding to the I/O data of the extra-equipment used by the master equipment and that the memory area E5, or E3, of the subsidiary equipment store only addresses corresponding to the I/O data of the extra-equipment used by the subsidiary equipment. In this case, the data in accordance with the address designated by the memory area E1, or E7, and the memory area E8, or E2, are transmitted and received in steps 10A and 10B, respectively. In addition, the data addressed by the memory area E3, or E5, in a step 13A and the data addressed by the memory area E6, or E4, in a step 13B are transmitted and received.

As referred to in the above described embodiment employing two PLCs, the master equipment and the subsidiary equipment, each alternatively executes its corresponding user program stored in its user program memory; when one equipment executes its own user program the other is in a waiting state. Therefore, system efficiency as a whole is remarkably improved, by allowing performance of auxiliary operations during that waiting time, for example, an action to check memories and I/O busses and another action to do service processing for a program console.

As above described with respect to a sequence control system comprising two PLCs, two PLCs are linked by busses necessary to transfer data. The invention is also able to construct a sequence control system using three or more PLCs. This allows a much larger scale of a sequence control system to be obtained, wherein this larger system acts much the same as above described.

In the sequence control system in accordance with the present invention that provides a plurality of PLCs linked by the data bus and the control bus, each PLC can perform a parallel execution of its corresponding user program, as exchanging I/O data necessary for each PLC among the plularity of PLCs. Then, each PLC can perform sequence control not only on the basis of the I/O data of the I/O address assigned to the intra-equipment, but also on the basis of the I/O data of the I/O address assigned to the extra-equipment.

Consequently, a sequence control system comprising a plurality of PLCs—an intra-equipment and extra-equipment—can successfully execute an overall program in which, for example, the intra-equipment transfers an input derived from an external machinery into the intra-equipment so that the extra-equipment controls an output to be transferred to another external machinery on the basis of the transferred input data. On the other hand, it is possible to execute another overall program in which the intra-equipment controls an output to an external machinery on the basis of the output status to be provided by the extra-equipment.

In the case of a sequence control system comprising three or more PLCs which are linkedly coupled, it is possible that a control action obtained by each PLC is correlatedly affective to other PLCs in a very complicated manner. Then, a manner to correlatedly connect the PLCs is freely determined, depending upon a user program stored in each PLC and it, further, does not need a definite instruction to perform the complicatedly correlated manner. Hence, a plularity of PLCs linkedly coupled perform a very complicated sequence control correspondent to a large scale user program as though one set of controller works, wherein function of each PLC is a parallel execution of a program assigned to it. Therefore, it is possible to eliminate various limitations before described in the case of an expanded system scale caused by connecting its input and output terminals among connected PLCs; further, it is possible to easily modify or expand the system scale, resulting in obtaining a versatile system arrangement.

As many apparently widely different embodiments of this invention may be made without departing from the spirit and scope thereof, it is to be understood that the invention is not limited to the specific embodiments herein described except as defined in the appended claims.

What is claimed is:

1. A sequence control system employing a plurality of programmable logic controllers for performing sequence control in accordance with a ladder diagram, said programmable logic controllers being linkedly coupled by data transfer means for transferring data among said programmable logic controllers, each said controller being available to independently perform individual sequence control in accordance with its ladder diagram and capable of exchanging data necessary to perform said sequence control, each said programmable logic controller comprising:

user program memory means for storing a user program which causes said sequence control to be performed, said sequence control using an address of an external programmable logic controller;

I/O circuitry means, including input means for receiving an input control signal from an external device and output means for sending an output control signal to an external device, said output control signal indicative of a sequence control to be performed in said external device;

system memory means for storing first data from said input control signal received by said I/O circuitry means in an external data area, and for storing second data in an internal data area;

CPU means, coupled to said system memory means, for successively executing instructions of said user program stored in said user program memory means to process said first data based on arithmetic operations with said second data to produce processed data, and for writing said processed data into said system memory means as revised output data which corresponds to said output control signal;

I/O interface means, coupled to said I/O circuitry means and said system memory means, for writing said input control signal into said external data area of said system memory means so as to revise data stored in external data area of said system memory means; and for setting output data stored in said external data area of said system memory means in said output means of said I/O circuitry means, said output data corresponding to said output control signal;

address table memory means for storing address data designating an address in said system memory means so as to write input data thereto and read out output data therefrom;

wherein said system memory means has an address space adequate to store input/output data corresponding to said plurality of linkedly connected programmable logic controllers, said address space having said internal data area, which is a field for intra-equipment, and said external data area, which is another field for at least one extra-equipment;

wherein said CPU mean includes:

(a) means for determining said address of said external programmable logic controller used by the user program of said user program memory means and for storing said address used in said extra-equipment field in said address table memory means in accordance with an initializing process performed prior to executing said user program;

(b) means for sending said address used said extra-equipment field through said data transfer means;

(c) means for receiving an input/output address from said extra-equipment and for storing said input/output address in said address table memory means;

(d) means for controlling a writing of said input control signal into said external data area of said system memory means and for controlling a transferring of said output data from said external data area of said system memory means to said I/O circuitry means; and (e) means for exchanging data addressed by said input/output address through said data transfer means to said extra-equipment and receiving corresponding data from said intra-equipment.

2. The sequence control system according to claim 1 wherein said CPU means includes means for successively executing the user program in said programmable logic controller while exchanging said data between said intra-equipment and any of said extra-equipment.

3. The sequence control system according to claim 2 wherein said CPU means includes means for holding a waiting status to perform auxiliary operations until its successive execution because of an execution of any of said extra-equipment linked to said intra-equipment.

4. A sequence control system employing a plurality of programmable logic controllers for performing sequence control in accordance with a ladder diagram, said programmable logic controllers being linkedly coupled by data transfer means for transferring data among said programmable logic controllers, each said controller being available to independently perform individual sequence control in accordance with its ladder diagram and capable of exchanging data necessary to perform said complicated sequence control, each said programmable logic controller comprising:

user program memory means for storing a user program which causes said sequence control to be performed, said sequence control using an address of an external programmable logic controller;

I/O circuitry means, including input means for receiving an input control signal from an external device and output means for sending an output control signal to an external device, said output control signal indicative of a sequence control to be performed in the external device;

system memory means for storing first data from said input control signal received by said I/O circuitry means in an external data area and for storing second data in an internal data area;

CPU means, coupled to said system memory means, for successively executing instructions of said user program stored in said user program memory means to process said first data based on arithmetic operations with said second data to produce processed data, and for writing said processed into said system memory means as revised output data which corresponds to said output control signal;

I/O interface means, coupled to said I/O circuitry means and said system memory means, for writing said input control signal into said external data area of said system memory means so as to revise data stored in external data area of said system memory means, and for setting output data stored in said external data area of said system memory means in said output means of said I/O circuitry means, said output data corresponding to said output control signal;

address table memory means for storing address data designating an address in said system memory means so as to write input data and read out output data;

wherein said system memory means has an address space adequate to store input/output data corresponding to said plurality of linkedly connected programmable logic controllers, said address space having said internal data area which is a field for intra-equipment, and said external data area which is another field for at least one extra-equipment;

wherein said CPU means includes:

(a) means for determining said address of said external programmable logic controller used by the user program of said user program memory means and for storing said address used in said extra-equipment field in said address table memory means in accordance with an initializing process performed prior to executing said user program;

(b) means for sending said address used said extra-equipment field through said data transfer means;

(c) means for receiving an input/output address from said extra-equipment and for storing said input/output address into said address table memory means;

(d) means for controlling a writing said input control signal into said external data area of said system memory means and for controlling a transferring of said output data from said external data area of said system memory means to said I/O circuitry means; and (e) means for exchanging data addressed by said input/output address through said data transfer means to said extra equipment and receiving corresponding data from said intra-equipment; and (f) means for synchronizing operations between said intra-equipment and said extra-equipment.

5. The programmable logic controller according to claim 4 further comprising means for selecting an operation mode of said controller.

6. The programmable logic controller according to claim 5 wherein said selecting means selects operation modes which correspond to one of a sequence control operation within said controller or another sequence control operation between a plurality of programmable logic controllers.

7. The programmable logic controller according to claim 4 which further comprises means for determining an equipment number data of said controller so as to identify said controller when a plurality of programmable logic controllers are linkedly connected.

8. The programmable logic controller according to claim 7 wherein said means for determining includes a settable switch which can be set between different equipment numbers.

9. The programmable logic controller according to claim 4 further comprising preset means for determining whether said controller will act as a master equipment in order to dominate other programmable logic controllers that are linkedly connected thereto.

10. The programmable logic controller according to claim 9 wherein said preset means includes a switch.

* * * * *